United States Patent
Rohloff et al.

(10) Patent No.: US 9,369,273 B2
(45) Date of Patent: Jun. 14, 2016

(54) SYSTEM AND METHOD FOR MIXING VOIP STREAMING DATA FOR ENCRYPTED PROCESSING

(71) Applicant: RAYTHEON BBN TECHNOLOGIES CORP., Cambridge, MA (US)

(72) Inventors: Kurt Ryan Rohloff, South Hadley, MA (US); David Bruce Cousins, Barrington, RI (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 109 days.

(21) Appl. No.: 14/191,035

(22) Filed: Feb. 26, 2014

(65) Prior Publication Data

US 2015/0244516 A1 Aug. 27, 2015

(51) Int. Cl.
*H04L 29/06* (2006.01)
*H04L 9/00* (2006.01)
*H04L 9/08* (2006.01)

(52) U.S. Cl.
CPC ............ *H04L 9/008* (2013.01); *H04L 9/083* (2013.01); *H04L 65/608* (2013.01)

(58) Field of Classification Search
CPC .................................................. H04L 63/0428
USPC ........................................ 380/257; 713/150
See application file for complete search history.

(56) References Cited

U.S. PATENT DOCUMENTS

| | | | |
|---|---|---|---|
| 7,415,005 B1 * | 8/2008 | Macha et al. | 370/352 |
| 2010/0166178 A1 * | 7/2010 | Berggren | H04L 63/0442 380/42 |
| 2011/0060918 A1 * | 3/2011 | Troncoso Pastoriza et al. | 713/189 |
| 2011/0142230 A1 * | 6/2011 | Zuili | 380/28 |
| 2011/0154016 A1 * | 6/2011 | Niccolini et al. | 713/150 |
| 2011/0243320 A1 * | 10/2011 | Halevi et al. | 380/30 |
| 2012/0023326 A1 * | 1/2012 | Kalan et al. | 713/156 |
| 2013/0169736 A1 * | 7/2013 | Lindblom | H04L 65/403 348/14.02 |
| 2013/0195103 A1 * | 8/2013 | Han | 370/352 |

OTHER PUBLICATIONS

Archer, "Computing with Data Privacy Steps Toward Realization", Jan./Feb. 2015, IEEE, p. 22-29.*
Coron, Jean-Sebastien et al.; "Public Key Compression and Modulus Switching for Fully Homomorphic Encryption over the Integers"; EUROCRYPT 2012; International Association for Cryptologic Research; 2012; pp. 446-464.

(Continued)

*Primary Examiner* — Kenneth Chang
*Assistant Examiner* — Gregory Lane
(74) *Attorney, Agent, or Firm* — Lewis Roca Rothgerber Christie LLP

(57) ABSTRACT

A method for data privacy in a VoIP system includes: generating a private key for an additive homomorphic encryption scheme; sending the private key to a plurality of client terminals to be used by each of the plurality of client terminals to encrypt a respective VoIP streaming data; receiving an encrypted VoIP streaming data from each of the plurality of client terminals, wherein each of the VoIP streaming data is encrypted using the same private key; performing an encrypted homomorphic addition on the encrypted VoIP streaming data to generate a mixed encrypted VoIP data stream; and sending the mixed encrypted VoIP data stream to the plurality of client terminals to be played back.

13 Claims, 5 Drawing Sheets

(56) References Cited

OTHER PUBLICATIONS

Gentry, Craig et al.; "A Working Implementation of Fully Homomorphic Encryption"; IBM T.J. Watson Research Center; 2010; 5pp.

Gentry, Craig; "A Fully Homomorphic Encryption Scheme"; a dissertation submitted to the department of computer science and the committee on graduate studies of Stanford University in partial fulfillment of the requirements for the degree of doctor of philosophy; Sep. 2009; 209pp.

Gentry, Craig; "Computing Arbitrary Functions of Encrypted Data"; Communications of the ACM; vol. 53, No. 3; Mar. 2010; 9pp.

Halevi, Shai et al.; "Design and Implementation of a Homomorphic-Encryption Library"; Apr. 11, 2013; 46pp.

Halevi, Shai et al.; "HElib: An Implementation of homomorphic encryption"; software library; 2013; 1pg.

Paillier, Pascal; "Public-Key Cryptosystems Based on Composite Degree Residuosity Classes"; Eurocrypt '99; 1999; pp. 223-238.

Riggio, Roberto et al.; "Secure Aggregation in Hybrid Mesh/Sensor Networks"; 2009 IEEE; 6pp.

Van Dijk, Marten et al.; "Fully Homomorphic Encryption over the Integers"; EUROCRYPT 2010; International Association for Cryptologic Research; 2010; pp. 24-43.

\* cited by examiner

SYSTEM AND METHOD FOR MIXING VOIP STREAMING DATA FOR ENCRYPTED PROCESSING

STATEMENT REGARDING FEDERALLY SPONSORED RESEARCH

This invention disclosure is related to a government contract number FA8750-11-C-0098. The U.S. Government has certain rights to this invention.

FIELD OF THE INVENTION

The present invention relates to data privacy and encryption and more specifically to a system and method for mixing VoIP streaming encrypted data for further processing.

BACKGROUND

A typical system for enabling multiple entities to exchanging data or communicate with one another may include a form of a distributed communication system, in which multiple parties to a communication are connected to each other through a network and a central hub or switch. In many circumstances, where that data being exchanged includes sensitive information, it is important to maintain privacy from external security threats. Additionally, in some circumstances, the network itself may not be reliably secure or trustworthy. For example, various parties engaging in a voice over Internet protocol (VoIP) teleconference may be speaking about sensitive information from various trusted locations throughout the world, but the telecommunication system or the central data mixer used to transmit the voice data between the parties may not be secure or trustworthy.

There has been prior work on the mixing of encrypted data, however, none of those approaches are compatible with the homomorphic encryption scheme such that privacy-preserving mixing can be performed for VoIP.

Moreover, these prior approaches do not cover encrypted VoIP teleconferencing, where encryption keys do not need to be shared with a VoIP mixer, in a manner that scales linearly with the number of participants (clients). Many consumer VoIP solutions do not support encryption of the signaling path or the media. As a result, the lack of encryption is a relative easy to eavesdrop on VoIP calls when access to the data network is possible.

SUMMARY OF THE INVENTION

In some embodiments, the present invention is a computer implemented method for data privacy in a distributed voice over internet protocol (VoIP) communication system. The method includes: generating a private key for an additive homomorphic encryption scheme; sending the private key to a plurality of client terminals to be used by each of the plurality of client terminals to encrypt a respective VoIP streaming data; receiving an encrypted VoIP streaming data from each of the plurality of client terminals, wherein each of the VoIP streaming data is encrypted using the same private key; performing an encrypted homomorphic addition on the encrypted VoIP streaming data to generate a mixed encrypted VoIP data stream; and sending the mixed encrypted VoIP data stream to the plurality of client terminals to be played back.

In some embodiments, the present invention is a VoIP communication system comprising: a trusted third party terminal for generating a private key for an additive homomorphic encryption scheme, and sending the private key to a plurality of client terminals to be used by each of the plurality of client terminals to encrypt a respective VoIP streaming data; and a VoIP mixer for receiving an encrypted VoIP streaming data from each of the plurality of client terminals, performing an encrypted homomorphic addition on the encrypted VoIP streaming data to generate a mixed encrypted VoIP data stream, and sending the mixed encrypted VoIP data stream to the plurality of client terminals to be played back, wherein each of the VoIP streaming data is encrypted by a respective client terminal using the same private key.

In some embodiments, the mixed encrypted VoIP data stream may be represented in a matrix, where each column of the matrix includes mixed encrypted VoIP data stream intended for a respective client terminal. Each column of the matrix that is intended for a respective client terminal can then be sent to that respective client terminal. In some embodiments, the entire matrix may be sent to all of the client terminals.

The common private keys may be generated by a trusted third party terminal or by a trusted client terminal and then sent to all of the client terminals.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

In some embodiments, the present invention is directed to a system and method for mixing streaming encrypted VoIP data. In some embodiments, the present invention is a system and method for parties (e.g., several client terminals) to a distributed VoIP communication session (using communication terminals) to have privacy-preserving VoIP communications, where communication privacy is maintained despite all communications of the client terminals (clients) being observed during the communications, even at a VoIP mixer.

In some embodiments, the present invention is a method for additive homomorphic encryption such that all client terminals have a common private key. The client terminals encode their voice samples with an additive encoding scheme, encrypt their encoded voice data with an additive homomorphic encryption scheme, and send their encrypted voice data to a VoIP mixer. The mixer performs an encrypted homomorphic addition on the encrypted voice and sends the results back to the client terminals. The client terminals then decrypt, decode and play back the result.

This approach pre-shares a common private key for an additive homomorphic encryption scheme, and the client terminals agree on a common additive encoding scheme. The present approach is compatible with encrypted VoIP teleconferencing using additive homomorphic encryption and ring switching. Any encryption system may be used with the system and method of the present invention that supports an additive homomorphism, key switching and representation switching to a common which could be implemented in a practical manner. A representational scheme is NTRU which can be made both Somewhat Homomorphic (SHE) and Fully Homomorphic (FHE). For the representational NTRU scheme, all ciphertexts are able to be represented as integer vectors which are ring elements where the length of the vectors is the ring dimension.

Figure 1:
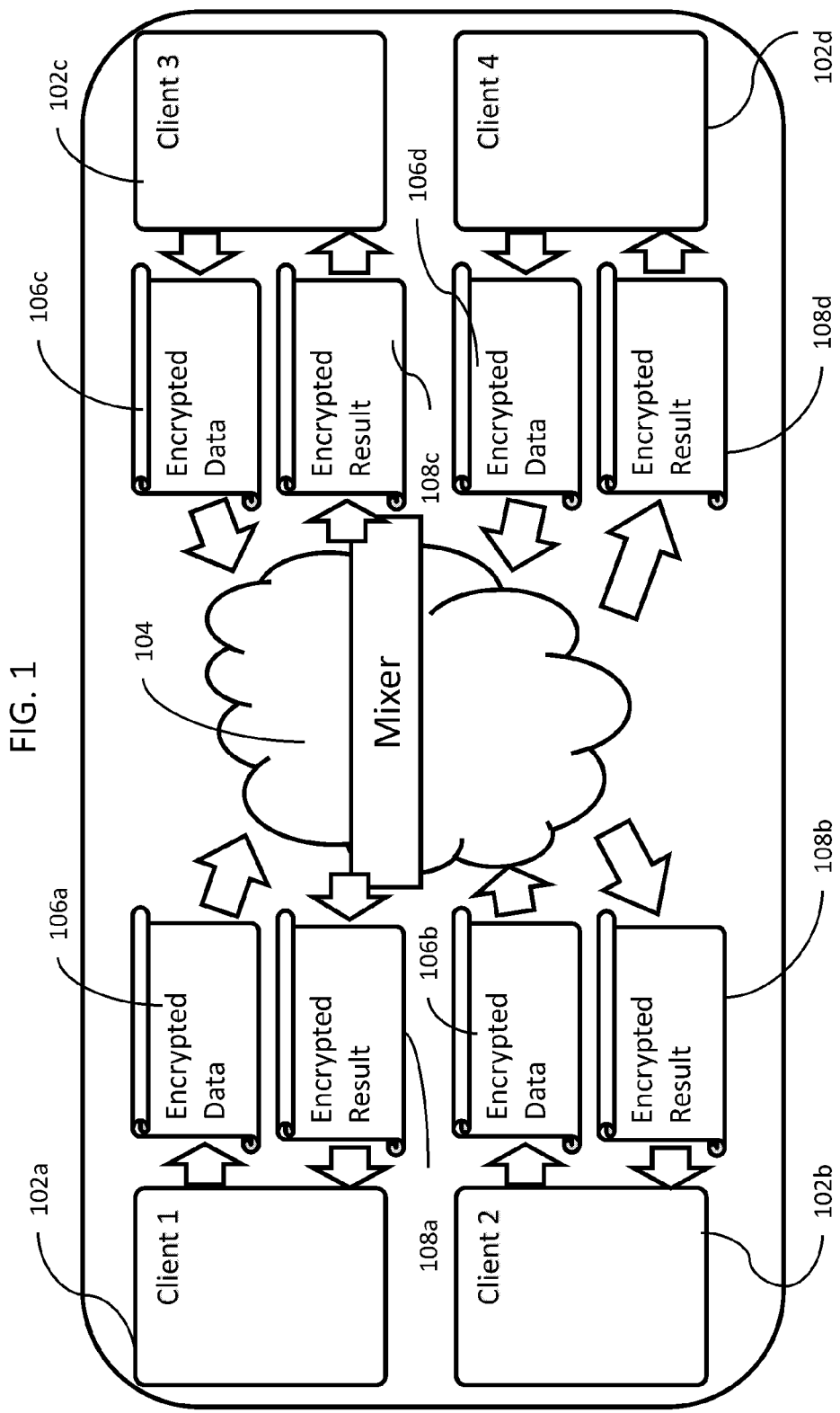
FIG. 1 shows an exemplary block diagram for a distributed communication system, according to some embodiments of the present invention.

FIG. 1 shows an exemplary block diagram for a distributed communication system, according to some embodiments of the present invention. Each of the VoIP client terminals 102a, 102b, 102c and 102d samples voice data, encodes it, encrypts it and sends the encrypted data 106a, 106b, 106c or 106d to a VoIP mixer 104. The VoIP mixer 104 operates on the encrypted data and sends the results 108a, 108b, 108c and 108d back to the respective client terminals, which are then decrypted, decoded and played back (in the case of voice) to the respective clients.

Figure 2:
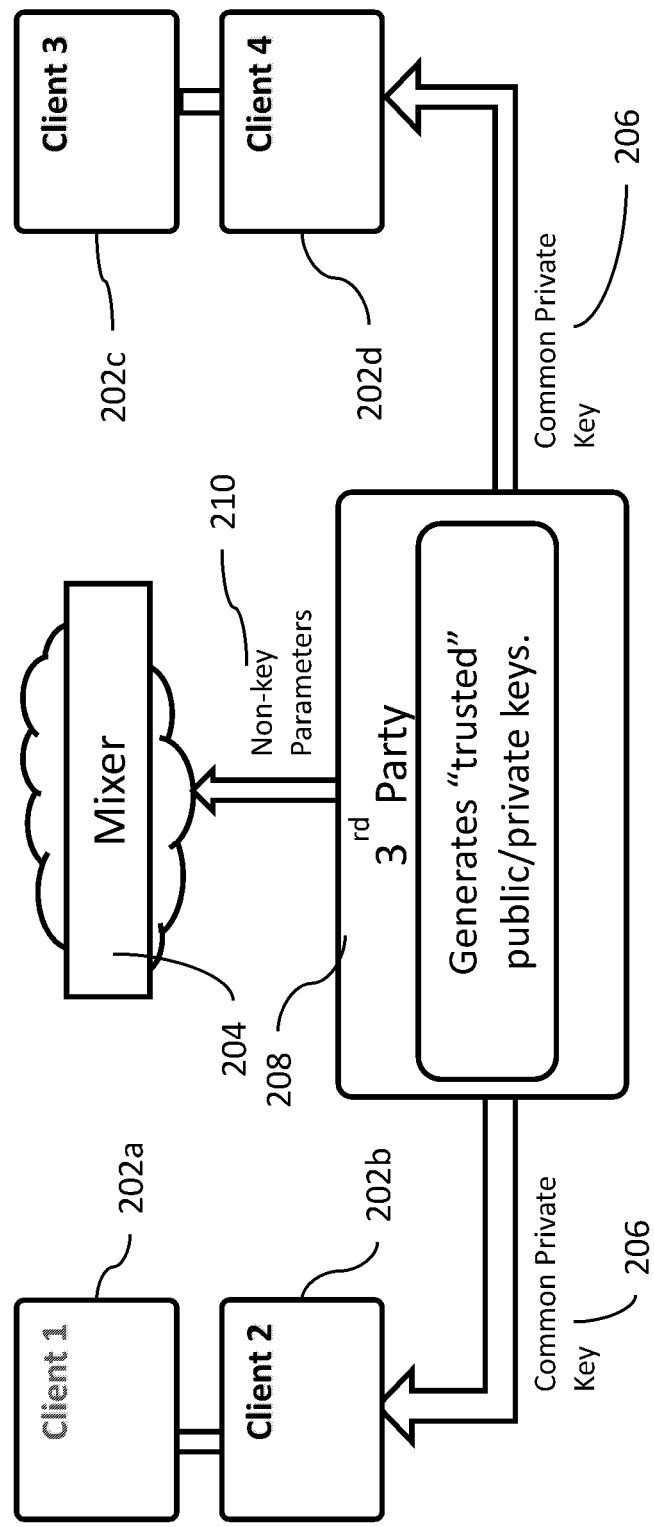
FIG. 2 depicts how encryption keys are shared by the client terminals, according to some embodiments of the present invention.

FIG. 2 depicts a high level representation of how encryption keys are shared by the client terminals, according to some embodiments of the present invention. Prior to initiation of a teleconferencing session between the clients, a trusted third party 208 generates public/private keys for the plurality of client terminals 202a, 202b, 202c and 202d and sends the common private keys 206 to all of the (participating) client terminals. Each of the client terminals then uses the common private key to encrypt its voice data and sends the encrypted data back to the third party 208. Also, the non-key parameters 210, if any, are shared with the VoIP mixer 204, prior to the beginning of the teleconference operation. For example, in the case of an NTRU-based additive homomorphic encryption scheme, the third party 208 may additionally provide the ring dimension and the ciphertext modulus to the mixer 204.

The trusted third party 208 may be a computer system or server under the control of an entity that can be trusted by each of the clients 202a-202d, in advance of the teleconferencing session. For example, if each of the users of the client terminals 202a-202d work with a particular company, the company may operate a computer system or server that operates as the trusted third party 208 and provides a common private key 206 to each of the client terminals 202a-202d, prior to traveling overseas and engaging in VoIP telephone conferences with each other. In some embodiments, the private key 206 may be generated by the third party 208, using a random number generator.

For a representational NTRU-based additive homomorphic encryption scheme, the VoIP mixer would need to know the ring dimension and ciphertext modulus. For example, a private key sk is generated for an NTRU-based scheme with parameters p and q, by randomly choosing a sk∈R, where R is a dimension-n ring such that sk=1 mod p and sk is invertible modulo q. This private key sk can be represented as an integer length-n vector. For a representational NTRU-based additive homomorphic encryption scheme, the VoIP mixer would need to know the ring dimension and ciphertext modulus.

The client terminals use the common private key 206 to encrypt (and decrypt) their voice data and send their encrypted voice data to the mixer 204.

The mixer performs mixing operation on the encrypted voice data and sends the results back to each of the client terminals. The mixed encrypted voice data is then decrypted, decoded and played back by each of the client terminals, as explained below.

Figure 3:
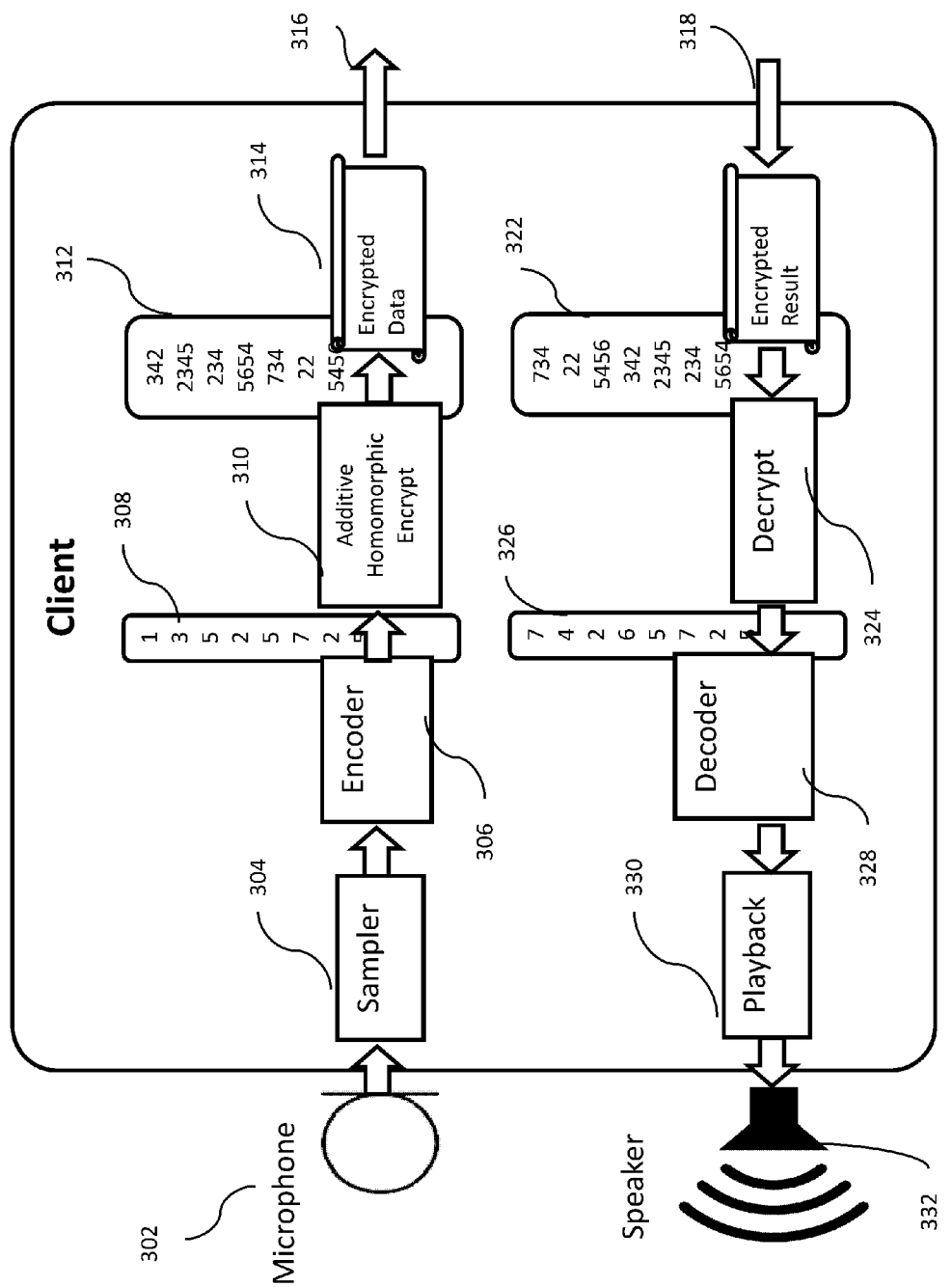
FIG. 3 shows data encryption and decryption by a client terminal, according to some embodiments of the present invention.

FIG. 3 shows data encryption and decryption by a client terminal, according to some embodiments of the present invention. As shown, each client terminal includes a microphone 302 to capture the voice, a sampler 304 to sample the analog voice signals, and a playback 330 to play back the voice via a speaker 332. As shown, a client terminal receives the voice signal from a microphone 302, samples the voice signal using the sampler 304 and feeds the sampled voice data to an (linear) encoder 306, which encodes the voice data and generates a voice data vector 308. The voice data vector 308 is then encrypted with client's common private key by an additive homomorphic encryption module 310, using an additive homomorphic encryption scheme.

The encrypted voice data is represented by vector 312, which is then sent (316) to a VoIP mixer to be operated on. After the mixing and/or other operations are performed, the encrypted result 318 is received from the VoIP mixer, for example, in the form of a vector 322. The result 318 is decrypted by a decryption module 324 to generate a vector 326 of decrypted voice data to be decoded by the decoder 328. The decrypted data is then played back (330) over a speaker 332.

In some embodiments, an NTRU algorithm is used as a representational additive homomorphic encryption scheme which provides encryption and decryption functions. The NTRU encryption algorithm is lattice based, and its security is based on the shortest vector problem.

In some embodiments, for the situation where the clients would not want to receive their own voice data in the encrypted results from the mixer, the encrypted results are presented in a matrix, where the encrypted voice data in each column of the matrix is the result from a given client. A column may be set to 0, if the corresponding recipient of the voice data matrix is not intended to receive the voice data being in that column, when the matrix is sent to the corresponding recipient. Redundant column data need not be carried through the process. For example, if cij represents the ciphertext from client i in the key j representation, the first summation would be [c22,c12,c12+c22]. The result of the 2nd summation would be [c23+c33,c13+c33,c13+c23,c13+c23+c33]. The result of a 3rd summation would be [c24+c34, c44,c14+c34+c44,c14+c24+c34,c14+c24+c34+c44].

Figure 4:
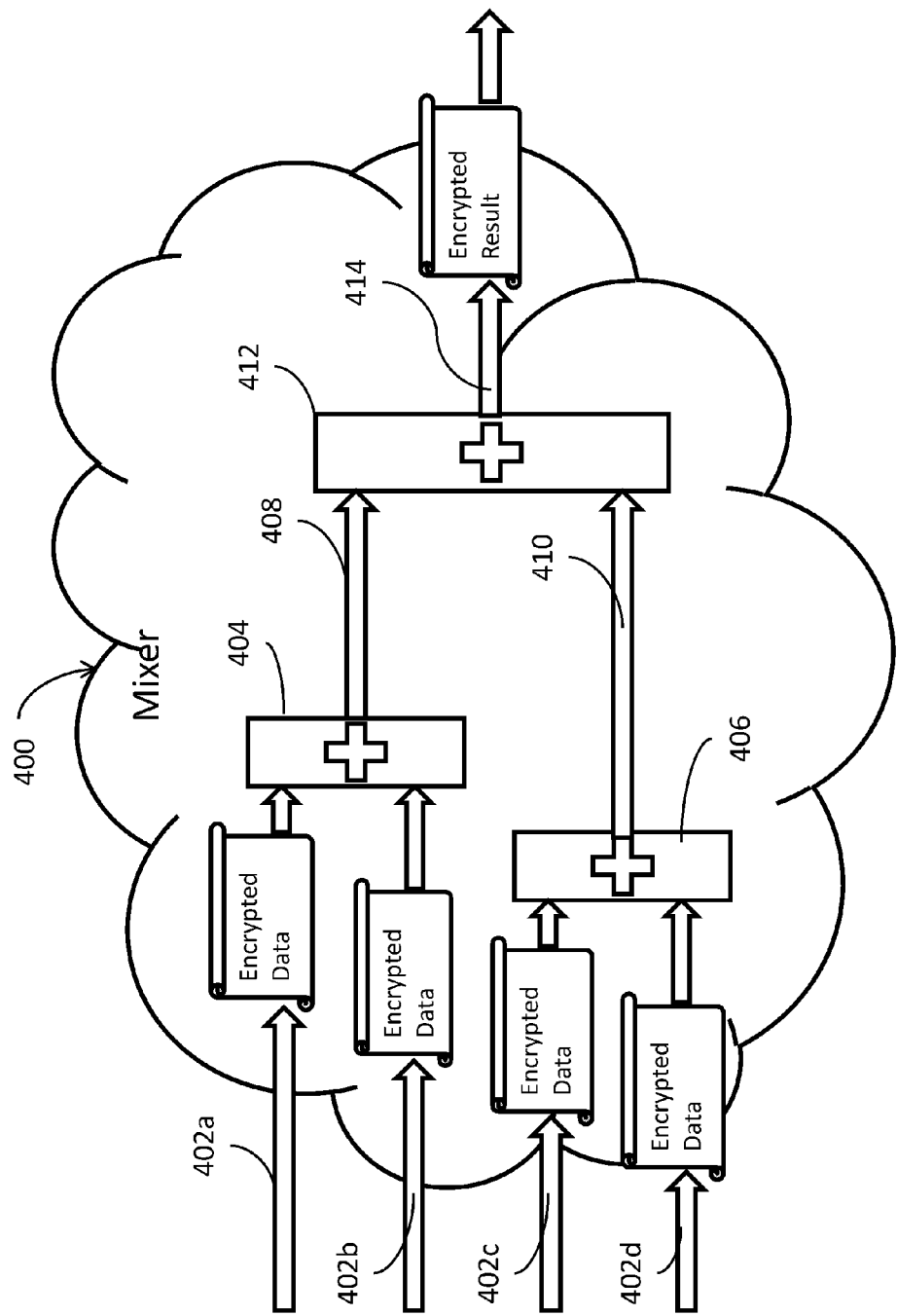
FIG. 4 shows an exemplary block diagram of a mixer, according to some embodiments of the present invention.

FIG. 4 shows an exemplary block diagram of a mixer, according to some embodiments of the present invention. As shown, the mixer 400 receives encrypted voice data streams 402a, 402b, 402c and 402d from respective client terminals. As explained above, each of the client terminals uses the common private key to encrypt their voice data and then sent it to the mixer. A first adder 404 then adds the first encrypted data 402a to the second encrypted data 402b to generate a first summed output 408. Similarly, a second adder 406 adds the third encrypted data 402e to the fourth encrypted data 402d to generate a second summed output 410. A third adder 412 then adds the first summed output 408 to the second summed output 410 to generate a third summed output 414, which is the encrypted result from the mixer. These embodiments may be generalized to situations with more clients by adding more adders so that all input data is filtered through a series of address to obtain a combined output. The encrypted result or a portion thereof is then sent from the mixer to each of the client terminals.

For a VoIP communication system with clients (c1, c2, c3, ..., cm), a client ci would want (c1+c2+...+c1−1+c1+1+...+cm). This summation can be performed in a tree fashion as illustrated in FIG. 4. In some embodiments, for an NTRU scheme, the ciphertexts are vectorized in blocks of m, and all additions are performed modulo some q, possibly pre-specified by the call organizer or by the key generator.

Figure 5:
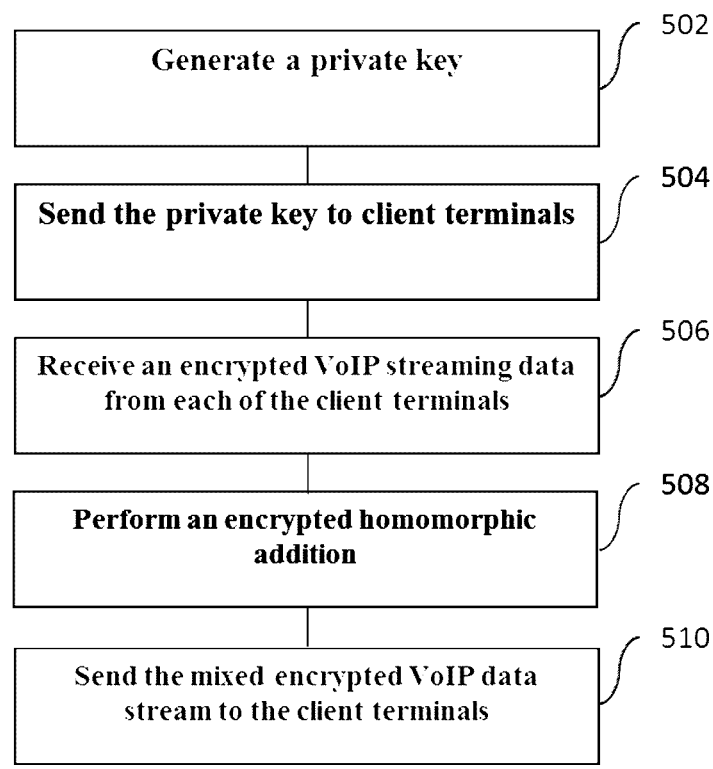
FIG. 5 is an exemplary process flow, according to some embodiments of the present invention.

FIG. 5 is an exemplary process flow, according to some embodiments of the present invention. In block 502, a private key is generated for an additive homomorphic encryption scheme. Along with the private key, a public key is also generated. The third party or any of the trusted client terminals may generate the private/public key pair. The private key (and the public key) is then sent to the client terminals, in block 504, to be used by each of the plurality of client terminals to encrypt their respective VoIP streaming data. In block 506, the encrypted VoIP streaming data from each of the plurality of client terminals is received by the mixer. Each of these VoIP streaming data is encrypted using the same private key that was sent to the clients.

The mixer then performs encrypted homomorphic additions on the encrypted VoIP streaming data to generate a mixed encrypted VoIP data stream, in block 508. In block 510, the mixer then sends the mixed encrypted VoIP data stream to the client terminals to be played back.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for data privacy in a distributed voice over internet protocol (VoIP) communication system, the method comprising:
generating a private key for an additive homomorphic encryption scheme;
sending the private key to a plurality of client terminals to be used by each of the plurality of client terminals to encrypt a respective VoIP streaming data;
receiving encrypted VoIP streaming data from each of the plurality of client terminals by a mixer, wherein each of the VoIP streaming data is encrypted using the same private key;
performing an encrypted homomorphic addition on the encrypted VoIP streaming data received from all of the plurality of client terminals, by the mixer, to generate a mixed encrypted VoIP data stream, wherein the mixer is a different device from each of the plurality of client terminals; and
sending the mixed encrypted VoIP data stream to the plurality of client terminals to be played back.

2. The method of claim 1, further comprising representing the mixed encrypted VoIP data stream in a matrix, each column of the matrix including mixed encrypted VoIP data stream intended for a respective client terminal.

3. The method of claim 2, further comprising sending each column of the matrix intended for a respective client teuninal to said respective client terminal.

4. The method of claim 2, further comprising sending the matrix to all of the client terminals.

5. The method of claim 1, further comprising representing the mixed encrypted VoIP data stream in a matrix, each column of the matrix including mixed encrypted VoIP data stream based on the encrypted VoIP streaming data received from a respective client terminal; and replacing the content of a respective column of the matrix corresponding to the respective client terminal with all zeroes, before sending the matrix to the respective client terminal.

6. The method of claim 1, wherein the private key is generated by a third party entity.

7. The method of claim 1, wherein the private key is generated by one of the plurality of client terminals.

8. A voice over internet protocol (VoIP) communication system comprising:
a third party terminal and client terminal comprising a memory;
the trusted third party terminal for generating a private key for an additive homomorphic encryption scheme, and sending the private key to a plurality of client terminals to be used by each of the plurality of client terminals to encrypt a respective VoIP streaming data; and
a VoIP mixer device for receiving an encrypted VoIP streaming data from each of the plurality of client terminals, wherein the VoIP streaming data from each of the plurality of client terminals is encrypted by the private key shared by all of the plurality of client terminals, performing an encrypted homomorphic addition on the encrypted VoIP streaming data received from all of the plurality of client terminals to generate a mixed encrypted VoIP data stream, and sending the mixed encrypted VoIP data stream to the plurality of client terminals to be played back, wherein each of the VoIP streaming data is encrypted by a respective client terminal using the same private key, and wherein the VoIP mixer is a different device from each of the plurality of client terminals.

9. The communication system of claim 8, wherein the mixer include electronic circuits to represent the mixed encrypted VoIP data stream in a matrix, wherein each column of the matrix includes mixed encrypted VoIP data stream intended for a respective client terminal.

10. The communication system of claim 9, wherein the mixer is further configured to send each column of the matrix intended for a respective client terminal to said respective client terminal.

11. The communication system of claim 9, wherein the mixer is further configured to send the matrix to all of the client terminals.

12. The communication system of claim 9, wherein the mixer is further configured to represent the mixed encrypted VoIP data stream in a matrix, each column of the matrix including mixed encrypted VoIP data stream based on the encrypted VoIP streaming data received from a respective client terminal; and replace the content of a respective column of the matrix corresponding to the respective client terminal with all zeroes, before sending the matrix to the respective client terminal.

13. The communication system of claim 8, wherein the third party terminal is one of the plurality of client terminals, which generates the private key.

* * * * *